United States Patent Office 3,361,621
Patented Jan. 2, 1968

3,361,621
METHOD FOR CONTROLLING MICRO-
ORGANISMS AND NEMATODES
George E. Lukes, El Cerrito, Calif., assignor to Stauffer Chemical Company, New York, N.Y., a corporation of Delaware
No Drawing. Filed May 31, 1963, Ser. No. 284,384
4 Claims. (Cl. 167—22)

This invention relates to a method of controlling microorganisms and nematodes by treating them and/or their soil habitat with partially chlorinated methyl thiocyanate esters. The invention also pertains to biocidal compositions containing as the active component thereof at least one of the aforenamed toxicants.

It is known that trichloromethyl thiocyanate is possessed of a certain degree of biological activity and there have been proposals to utilize this compound as a toxicant for controlling various pest organisms. According to U.S. Patent 2,650,240, the toxicity of trichloromethyl thiocyanate was demonstrated against such insects as the housefly and the confused flour beetle and against nematodes as exemplified by the root-knot nematode (*Heterodera marioni*). The same patent also mentions that the the compound exhibits a retardation of plant growth including both fungi and leaf vegetation.

It would appear desirable, therefore, to experiment with other chlorinated thiocyanates and to this end we have examined various derivatives embodying structural features generally suggestive of biological activity. Of the compounds which were investigated during the course of these researches, the partially chlorinated methyl thiocyanates turned out to be among the most outstanding. Specifically, we prepared chloromethyl and dichloromethyl thiocyanates which were tested for biocidal activity against certain types of microorganisms and nematodes. After the test data was collected and evaluated, the results revealed an unexpected finding. The virulency of the mono and dichlorinated methyl thiocyanate was strikingly higher than predicted and exceeded by several times the toxicity of the trichlorinated methyl thiocyanate, a fact which is readily apparent from an inspection of the test results recorded in the table elsewhere herein. Moreover, the partially chlorinated methyl thiocyanates of the invention are more potent than the unsubstituted methyl thiocyanate, a known soil sterilant which exhibits about the same activity as its fully chlorinated counterpart, i.e. trichloromethyl thiocyanate. For some reason as yet unexplained, peak toxicity in these compounds is achieved when at least one free hydrogen remains in the chlorinated methyl thiocyanate.

Although the increased biocidal activity of the partially chlorinated methyl thiocyanates constitutes an important advantage—such enhanced toxicity means that the quantity of active component required to disinfect a particular locus can be drastically reduced—it has been found that the compounds possess an ancillary but nonetheless desirable characteristic, to wit, low phytotoxicity. This property is especially useful when one is confronted with the problem of freeing a tract of soil or fungi, nematodes and other harmful indwelling organisms after the soil has been planted with food crops. Manifestly, such an operation necessitates or requires a toxicant capable of destroying the soil pest organisms while at the same time leaving the food crops undamaged. Due to their high toxicity against microorganisms and nematodes, coupled with low phytotoxicity, the herein described partially chlorinated methyl thiocyanates are well suited to the sterilization of soil subsequent to planting with crops and this constitutes an important part of the invention.

The chlorinated methyl thiocyanates are known chemical entities, the description and preparation of which can be found in the chemical literature and in this connection reference is made to Beil. 3 II 124 and Ber. 83, 87 (1950). In general, the compounds can be formed by condensing an ammonium or alkali metal thiocyanate with a bromochloromethane in the presence of dimethylformamide as catalyst. An alternate method calls for reacting the requisite chloromethylsulfenyl chloride with an alkali metal cyanide in the presence of acetic acid. A typical procedure is illustrated below which describes the preparation of chloromethyl thiocyanate:

CHLOROMETHYL THIOCYANATE ($ClCH_2SCN$)

A mixture of 200 ml. of methylethylketone (solvent) and 20 ml. of dimethylformamide (catalyst) was placed in a 500 ml., 3-neck flask equipped with thermometer, stirrer and condenser. To this mixture was added 76 g. (1.0 M) of ammonium thiocyanate followed by the introduction of 130 g. (1.0 M) of chloromethylbromide, while maintaining thorough agitation. Ammonium bromide precipitated immediately following the first introduction of the chloromethylbromide.

After refluxing for a period of one and one-half hours, the reaction mixture was poured into ice water and the organic portion extracted with benzene. The benzene extracts were dried and the benzene removed by distillation. The chloromethyl thiocyanate was collected as a colorless liquid, boiling at 57° C./6 mm. There was obtained 57 g. of the purified product which amounted to 53% of theory.

In preparing biocidal compositions based on the compounds of this invention, the usual methods of formulation known to the art can be resorted to. For example, the compositions can be prepared in the form of solids or liquids. Solid compositions are formulated to give homogeneous free-flowing dusts by admixing the active component of the invention with finely divided solids as exemplified by talc, natural clays, diatomaceous earth, fuller's earth or various flours such as walnut shell, wheat, soya bean, cottonseed flours and the like. In the event liquid compositions are desired, these may be produced by admixing the toxicant of the invention with a suitable liquid diluent. In some cases the compounds are sufficiently soluble in the common pesticide solvents such as kerosene, xylene, fuel oil, the alkylated naphthalenes and the so-obtained solutions can be applied directly. Such solutions may also contain a surface-active agent in order that the active compounds can be readily dispersed in water or other liquids. Such aqueous dispersions are readily applied as a spray or mist. The surface-active agents can be of the anionic, cationic or nonionic types. Typical examples of such surface-active agents are sodium stearate, potassium laurate, morpholine oleate, sodium lauryl sulfate, sodium 2-ethylhexyl sulfate, sodium napthalenesulfonate, sodium alkylnaphthalenesulfonate, sodium sulfosuccinate, sodium oleic acid sulfonate, sodium castor oil sulfonate, glycerol monostearate containing a soap (or a sodium fatty alcohol sulfate), lithium stearate, magnesium oleate, aluminum stearate, methyl cellulose, sodium salt of ligninsulfonic acid, polyoxyethylene fatty alcohol ethers, polyglycol fatty acid esters, polyoxyethylene modified fatty acid esters, polyoxyethylene-polyol fatty acid esters, polyoxypropylene fatty alcohol ethers, polypropylene glycol fatty acid esters, polyoxypropylene modified fatty acid esters, polyoxypropylenepolyol fatty acid esters, polyol fatty acid monoesters, lecithin, di- and higher polyhydric alcohol fatty acid esters, cholesterol and other fatty acid esters, lanolin, oxidized fatty oils, quaternary ammonium salts such as lauryl dimethyl benzyl ammonium chloride, amine hydrochlorides such as laurylamine hydrochloride, alkylated aryl polyether alcohols such as the condensation product of diamylphenol with ethylene oxide, and the like. Mixtures of such agents can be used to combine or modify properties. The proportion of these agents will ordinarily vary from about 1% or less to about 15% by weight of the pesticidal compositions. Other pesticides as well as such adjuncts as fertilizers, activators, adhesives, spreaders and synergists can be added to the formulations if desired.

The following specific tests were carried out with the mono and dichloromethyl thiocyanates of the invention:

In vitro

*Sealed vial.*—1 oz. bottles were partially filled with 10 ml. of malt or nutrient broth and capped with aluminum foil and sterilized. The toxicant, as described herein, was injected by means of a syringe through the foil and into the broth. Next water suspension of *Escherichia coli*, *Penicillium* and *Rhizopus nigricans* were injected into the bottles and the bottles sealed and held one week before the results were read. The results showed that the aforenamed microorganisms were completely controlled at concentrations from 0.1 to 1.0 p.p.m., concentrations which are much lower than needed by the trichloro analog as shown in the table.

Nematocide incorporation test

This test detects nematocidal action within the soil interstices. Sealed quart-jar containers are filled with sterilized soil which is then inoculated with root-knot nematodes. A small depression is formed in the soil and the cavity filled with coarse sand. One ml. of a 5% acetone solution of a candidate compound is pipetted onto the sand and the jar sealed. The mixture of sand, soil and test compound is fairly shaken to insure mixing of all the components after which the jar is sealed and allowed to remain closed for forty-eight hours. After this, the soil is removed from the jars and placed into paper containers. The soil in the paper containers is allowed to stand in a greenhouse for one week for airing after which a tomato plant is transplanted into it. The root-knot nematodes attack the roots if they survive the chemical treatment resulting in swellings or knots. Three weeks later, the plant is removed from the soil and the roots inspected and the results evaluated. In this test, the monochloro analog killed all nematodes at a concentration of 40 p.p.m., the dichloro at 20 p.p.m., while the trichloro analog or the unsubstituted ester required 160 p.p.m.

Soil mix test

This test is formulated for the purpose of ascertaining the fumigant and non-fumigant activity of the toxicant against soil fungi. Typical plant pathogens which are used in conducting the tests are exemplified by *Rhizoctonia solani* and *Pythium ultimum*, and the like. The test pathogens are mixed with sterilized soil and one pound portions thereof are placed in quart jars. A small depression is formed in the soil and filled with coarse sand. One ml. of a 5% acetone solution of the test compound is pipetted onto the sand and the jar sealed and shaken thoroughly in order to mix the compound soil and sand. The test soil mixture is next placed in a paper container and seeded with cotton or Pinto beans and sealed with water. Cotton infection by the Pythium or Rhizoctonia is observed two or three weeks later, after which the results are evaluated.

The results obtained in carrying out the aforedescribed tests with the compounds of the invention are summarized in the accompanying table.

TABLE

| Compound | In Vitro, Lowest Concentration Giving Control | | | Soil Mix, Percent Control at Indicated Concentrations | | | | | | | | | Root Knot Nematode,[a] p.p.m. |
|---|---|---|---|---|---|---|---|---|---|---|---|---|---|
| | *Aspergillus niger*, p.p.m. | *Penicillium* Sp., p.p.m. | *Escherichia coli*, p.p.m. | *Rhizoctonia solani*, p.p.m. | | | | *Pythium ultimum*, p.p.m. | | | | | |
| | | | | 110 | 55 | 27 | 13 | 50 | 25 | 10 | 5 | 2.5 | |
| ClCH$_2$SCN | b.1 | (.1) | 1 | | e 100 | 75 | 50 | d 100 | d 100 | 100 | 100 | 100 | 40 |
| Cl$_3$CSCN | 1 | (.5) | (1) | | e 100 | 0 | 0 | 100 | 0 | 0 | 0 | 0 | 160 |
| Cl$_2$CHSCN | b.1 | .5 | (.5) | | e 100 | 75 | 0 | 100 | 100 | 100 | 100 | 100 | 20 |
| CH$_3$SCN | 50 | 50 | >(50) | | | | | | | | | | 160 | a = P.p.m. to Give Complete Control.
b = Lowest Rate Tested.
c = Moderate Injury.
d = Severe Injury.
( ) = Partial Control.

Although the test data offers clear testimony to the greater virulency of the partially chlorinated methyl thiocyanates compared with the fully chlorinated or unsubstituted esters, the results of the soil mix test are especially noteworthy. Thus, whereas complete control of *Pythium ultimum*, a typical soil fungus, necessitated a concentration of 50 p.p.m. of the fully chlorinated methyl thiocyanate, identical results could be achieved with a mere 2.5 p.p.m. of the partially chlorinated methyl thiocyanates. A simple computation shows the toxicants of the invention to be some twenty times more effective as a soil fungicide than the hitherto proposed fully chlorinated methyl thiocyanates.

I claim:

1. The method of treating nematode-infested soil which comprises applying to the soil a nematocidally effective quantity of a toxicant selected from the class consisting of ClCH$_2$SCN and Cl$_2$CHSCN.

2. The method of treating fungus-infested soil which comprises applying to the soil a fungicidally effective quantity of a toxicant selected from the class consisting of ClCH$_2$SCN and Cl$_2$CHSCN.

3. The method of combatting nematodes which comprises applying to nematode infested soil a nematocidally effective quantity of monochloromethyl thiocyanate.

4. The method of combatting fungi which comprises applying to fungi infested soil a fungicidally effective quantity of monochloromethyl thiocyanate.

References Cited

UNITED STATES PATENTS

2,650,240   8/1953   Olin _____ 167—39
2,722,478  11/1955   Olin _____ 167—39

ALBERT T. MEYERS, *Primary Examiner.*

JULIAN S. LEVITT, *Examiner.*

J. D. GOLDBERG, *Assistant Examiner.*